Patented Aug. 20, 1929.

1,724,906

UNITED STATES PATENT OFFICE.

WILLIAM W. CHRISTMAS, OF RIDGEFIELD PARK, NEW JERSEY.

RUBBER LATEX-PROTEID COMPOUND.

No Drawing.    Application filed March 27, 1924.  Serial No. 702,431.

This invention relates to a new compound or composition of matter resulting from the combination of raw or uncoagulated rubber latex, as contradistinguished from rubber in any form, and a proteid substance, preferably casein, or any proteid, albuminoid or other amorphous nitrogenous substance best suited for the purpose intended; and to a process of making a compound embodying such substances.

By rubber latex I mean the true milk of the rubber tree, i. e., Ficus elastica, (or any other rubber producing plants), in its pristine or uncoagulated condition, in which condition it (the rubber latex) contains no coagulated rubber, as such, but which is convertible into raw rubber by the process of oxidation, as, for example, by the oxidizing action of atmospheric air, smoke or chemicals upon the evaporation of the water content of the milk. The composition of this raw rubber latex as used by me is as follows: rubber (so-called) 35.62%; resin, 1.65%; protein, 2.03%; mineral, 0.70%; sugar, trace; water, 60%. The rubber latex employed by me therefore is the raw milk per se prior to its oxidation or conversion into the substance known as rubber, and in which the protein constituent is in solution and not suspended in colloidal form. This identification of the substance employed is given because the milk of the rubber tree or its kindred flora is not, strictly speaking, a rubber latex, although so termed in the rubber trade. Importance is given to the precise character of the so-called "rubber latex" used by me since it is impossible to secure the results I attain by the use of a rubber coagulum. Ficus latex is also preferably employed, in preference to any other, because of its capability of combining more readily and intimately with casein or its equivalent, thereby enabling a composition of maximum homogeneity, durability and toughness to be obtained.

One object of the invention is to provide a compound which, in the various forms in which it may be produced, is adapted to be employed as an inexpensive substitute for leather and various rubber compositions in the industrial arts.

A further object of the invention is to provide a method by means of which a compound of this character may be produced in a simple, reliable and efficient manner.

In carrying my invention into practice, I provide a composition of matter or chemical compound resulting from the chemical composition, in suitable proportions, of raw or uncoagulated rubber latex, casein or other proteid or albuminoid, a solvent for reducing the normally insoluble casein to a proper condition for use, a vulcanizing agent and suitable accelerator therefor, if desired, and other ingredients for promoting the chemical combination of the first two named ingredients and for increasing the strength, toughness, durability, water resisting qualities, and retaining permanency of elasticity and resistance against disintegration or drying out of the product. One formula which may be employed for the purpose is as follows, although I desire it to be understood that I do not limit myself to the exact ingredients or proportions specified:

| | | |
|---|---|---|
| Casein | 1 | lb. |
| Water | 4 | lbs. |
| Raw uncoagulated rubber latex | 4 | lbs. |
| Ammonia (26°) | 2 | ozs. |
| Sulphur | ½ | oz. |
| Lime (hydrated) | 1½ | ozs. |
| Ammonium sulphate | ½ | oz. |
| Litharge or zinc oxide | ½ | oz. |
| Tetramethylthiuriamdisulphide | ¼ | oz. |

In the use of gluten or other amorphous nitrogenous substances in place of casein, the proportions may vary as best commercial practice may require or as occasion demands according to the particular species of proteid used and in order to meet the stated conditions as to relative percentages of latex and proteid employed.

In the practice of the method of combining these substances for the production of the new compound, the following procedure is preferably employed.

The casein, which is insoluble, is reduced to a soluble state by heating it with water to 160°–200° F. with the strong ammonia. This gives a thick, heavy, smooth paste, the dissolving of the casein in the strong ammonia water being complete. The sulphur, lime, ammonium sulphate, zinc oxide or litharge and the tetramethylthiuriamdisulphide are then added to this paste, and thoroughly incorporated therewith by stirring or otherwise, after which the rubber latex is gradually added to the mixture while it is stirred or agitated to thoroughly incorporate the same therewith, the combination of the ingredients being effected while the mixture is being subjected to heat within the temperature ranges noted. A smooth, thick, pasty-like mass is thus produced, which may be molded or otherwise shaped into a desired form, and which is yet smooth and limpid enough to be poured over upon a slab, table or other similar surface. In the composition given the amount of casein used in proportion to the raw rubber latex used is just sufficient or in proper ratio to give the latex the highest possible protein content, in other words, the largest amount it will take up in solution to the saturation point and not to a point of over-saturation and therefore not to a point where a possible colloidal dispersion may result. This is readily determined by experiment, which is necessary because the protein content of the latex may vary within certain degrees according to the character of the latex employed. In the instance given the ratio for producing a composition having the largest amount of protein which can be taken up in solution is one part, by weight, of casein to each four parts of latex. This is the case in the use of ficus latex, the general composition of which is given. The plastic substance thus produced is, therefore, a complete chemical mixture, in which the casein and rubber, as such, are substantially or entirely lost, the product being an entirely new substance.

The new substance thus made may, as stated, be molded or otherwise shaped into a desired given form, but for the production of the material in sheet form for commercial use, for which it is best adapted, it is poured or otherwise suitably spread on level tables or other suitable surfaces and left to cool, harden and dry. This hardening and drying process takes from a few days to two or three weeks, according to the thickness of the pour and resulting thickness of material desired.

After the material has dried, it is vulcanized at a low temperature of about 125° F., more or less, for a period of about three hours, more or less, which is sufficient to start the vulcanizing process at the low temperature given, the material then being removed from the oven and stored until complete vulcanization is effected, by ordinary room temperature, which thereafter proceeds by natural process. The time required for this complete curing or vulcanizing process is usually about thirty days, after which the material is ready for the market.

The material produced in the manner described according to my invention is very strong, tough, durable and elastic. It may be made in sheet form of a thickness less or equal to ordinary sole leather and used as a leather substitute in the manufacture of shoe soles and other sheet leather products of any desired thickness. It provides a substance for such purpose which is not only cheaper, but tougher and more durable than ordinary sole leather or other similar leather, the product being as elastic or of somewhat greater elasticity than rubber and about 2¼ times as strong as the best ordinary sole leather and about equal in durability and toughness to rawhide. It may be sewed, cut and trimmed with the ordinary shoemaker's tools and when stitched the stitches will not pull out. It is distinctly superior to leather in that it is waterproof and will not dry out or lose its elasticity.

The curing treatment referred to gives toughness, durability and wearing qualities to the material, the density and degree of elasticity depending upon the thickness of the material; material which is of a thickness of a quarter of an inch or more, and which is more or less elastic in character, being suitable for use in the manufacture of bath mats and pads of various kinds. By slight variations in the amount of sulphur and other modifying ingredients used and of the treatment of the material, its degree of pliability may be regulated and varied, while preserving strength and toughness.

The material may also be used as a substitute for rubber composition products, such as, for example, in the manufacture of the shoes or casings of automobile tires, or for use as upholstery, or where the use of a tough, durable and flexible covering or wear surface is necessary. When so used, it is less subject to puncture than built-up, vulcanized rubber and fabric casings and has much greater wearing qualities and durability. Similarly, the material made as tough and pliable as desired, may be used for the production of many articles in which rubber and fabric or rubber and other substances are used, where a mat, covering or protecting surface of sheet material is required. In general, it may be stated that this new material, in sheet form, may be used to take the place of either leather or rubber when a sheet substance having strength, toughness and wearing qualities, as well as more or less pliablity or elasticity, is to be produced.

In the manufacture of this improved material, various proteids other than casein may be used with more or less satisfactory results, such as gluten, animal glue, gelatin and other similar albuminous or proteid substances and equivalent nitrogenous substances, animal or vegetable, the use of casein or gluten, however, being preferred because it gives the best results. The use of raw uncoagulated rubber latex of the milk of the rubber tree in its natural condition, as contradistinguished from the oxidized latex or rubber in any other form, is however of prime importance and essential in this composition, as the oxidized milk, to wit, raw rubber, or rubber in any form, can not be used, because a chemical combination between it and a proteid substance can not be properly effected. The basis of this composition, as will be understood, resides broadly in the chemical (more or less) combination of pristine rubber latex and a proteid, such as casein or gluten or any equivalent amorphous nitrogenous substance, animal or vegetable.

In this composition the lime acts as a setting and hardening agent to effect coagulation of the proteid and to give strength and toughness to the product, while the ammonium sulphate, or an equivalent hygroscopic salt, serves to keep the product pliable and to prevent it from drying out. I may, however, under certain conditions and in the preparation of the product for certain purposes, omit the ammonium sulphate. The zinc oxide is employed as a toughening agent, for which purpose it acts without unduly hardening the product, the lime producing the degree of hardness desired. The tetramethylthiuriamdisulphide acts as an accelerator on the sulphur to promote and hasten vulcanization at the stated low temperature above atmospheric temperature to a degree at which vulcanization under artificial heat is effected and from which point curing or vulcanization to a complete degree may be carried out naturally or under ordinary atmospheric (room) temperature. By partially vulcanizing the material at a low artificial temperature, during which the free sulphur content is driven off, and thereafter allowing vulcanization to proceed to completion at normal atmospheric (room) temperature, which appears to be due to some chemical or natural molecular change or germicidal action, an important advantage is gained in that the material hardens or solidifies and toughens without loss of elasticity, or, in other words, without becoming both hard and brittle. The litharge and oxide of zinc are, in general, equivalents of one another, that is, have the same properties, in their use in this combination. Either may be ordinarily used in place of the other without change of action, although the use of the one or the other may be preferred under some particular conditions. Both the oxide of zinc and the litharge have a desirable property, i. e., that of acting as an intermediary between the vulcanizing and accelerating agents to effect their rapid combination and cooperation for the vulcanizing action.

Having thus fully described my invention, I claim:

1. The process of making a compound of the character described, which consists in dissolving casein in a strong ammonia solution heated to a temperature of from 160 to 200° F., combining raw rubber latex therewith, and then drying and vulcanizing the composition so produced.

2. The process of producing a compound of the character described, which consists in dissolving casein in a strong ammonia solution heated to a temperature of from 160 to 200° F., combining therewith a raw rubber latex in the proportion approximately, by weight, of four parts of the latex to each one part of the casein, and then drying and vulcanizing the composition so produced.

3. The method of making a compound of the character described which consists in dissolving casein in an alkaline solution at a temperature of from 160 to 200° F., combining therewith a raw rubber latex in such proportion relative to the casein that the protein content will be substantially equal to that amount which the latex will take up to the point of saturation, and then drying and vulcanizing the composition so produced.

4. The process of making a compound of the character described, which consists in dissolving casein in an alkaline solution at a temperature of from 160 to 200° F., combining therewith ficus latex in such proportion relative to the casein that the protein content will be substantially equal to that amount which the latex will take up to the point of saturation, and then drying and vulcanizing the composition so produced.

5. The method of making a compound of the character described, which consists in dissolving casein in an ammonia solution heated to a temperature of from 160 to 200° F., combining therewith ficus latex in the proportion approximately, by weight, of four parts of the latex to each one part of the casein, and then drying and vulcanizing the composition so produced.

6. A compound resulting from the combination of casein dissolved in an alkaline solution, together with ficus latex and a vulcanizing agent, the latex being in the proportion approximately of four parts, by weight, to each one part of the casein, the said compound having the properties obtained by drying and vulcanizing the composition so produced at a low temperature until partial vulcanization is effected, and allowing the mass to cure and to become completely vulcanized at atmospheric temperature.

7. The process of making a compound of the character described, which consists in dissolving casein in an alkaline solution at a temperature of from 160° to 200° F., adding lime thereto, combining raw rubber latex therewith, and drying and vulcanizing the composition so produced.

8. The process of making a compound of the character described, which consists in dissolving casein in a strong ammonia solution at a temperature of from 160° to 200° F., adding lime thereto, combining raw rubber latex therewith, and drying and vulcanizing the composition so produced.

In testimony whereof I affix my signature.

WILLIAM W. CHRISTMAS.